(12) United States Patent
Kurimoto et al.

(10) Patent No.: US 12,743,911 B2
(45) Date of Patent: Sep. 22, 2026

(54) BATTERY REUSE MANAGEMENT SYSTEM

(71) Applicant: TOYOTA JIDOSHA KABUSHIKI KAISHA, Toyota (JP)

(72) Inventors: Yasuhide Kurimoto, Kasugai (JP); Hiroshi Yamasaki, Nagoya (JP); Masahiro Kagami, Nagoya (JP); Kenji Zaitsu, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 28 days.

(21) Appl. No.: 19/066,643

(22) Filed: Feb. 28, 2025

(65) Prior Publication Data

US 2025/0308299 A1 Oct. 2, 2025

(30) Foreign Application Priority Data

Mar. 26, 2024 (JP) ................................ 2024-049003

(51) Int. Cl.

| | |
|---|---|
| ***G07C 5/04*** | (2006.01) |
| *B60L 53/80* | (2019.01) |
| *B60L 58/10* | (2019.01) |
| *H01M 10/42* | (2006.01) |

(52) U.S. Cl.

CPC ................ *G07C 5/04* (2013.01); *B60L 53/80* (2019.02); *B60L 58/10* (2019.02); *H01M 10/425* (2013.01); *H01M 2010/4271* (2013.01)

(58) Field of Classification Search

CPC . G07C 5/04; B60L 53/80; B60L 58/10; B60L 53/65; B60L 3/12; B60L 58/18; H01M 10/425; H01M 2010/4271; H01M 10/48

See application file for complete search history.

(56) References Cited

U.S. PATENT DOCUMENTS

| | | | | |
|---|---|---|---|---|
| 9,285,433 | B2 * | 3/2016 | Kurimoto | G06F 15/00 |
| 12,352,815 | B2 * | 7/2025 | Jinno | G01R 31/367 |
| 2018/0308300 | A1 * | 10/2018 | Kurimoto | G06F 16/955 |
| 2022/0266838 | A1 * | 8/2022 | Kobayashi | B60W 40/09 |

(Continued)

FOREIGN PATENT DOCUMENTS

| | | |
|---|---|---|
| JP | 2015-101195 A | 6/2015 |
| JP | 2018-181323 A | 11/2018 |
| JP | 2022-128891 A | 9/2022 |

*Primary Examiner* — Jason Holloway

(74) *Attorney, Agent, or Firm* — SoraIP, Inc.

(57) ABSTRACT

A battery reuse management system manages reuse of a battery pack installed in vehicles. The battery reuse management system acquires battery information reflecting the use history of the battery pack during primary use in the vehicle. The battery reuse management system acquires first traveling record information indicating at least one of the total traveling distance and position history of the vehicle, and acquires second traveling record information by abstracting the first traveling record information. The battery management information includes battery information and the second traveling record information, but does not include the first traveling record information. The battery reuse management system acquires a reuse ID which is identification information for the battery pack during reuse. The battery reuse management system provides the reuse ID and the battery management information to a user who reuses the battery pack.

5 Claims, 6 Drawing Sheets

(56) References Cited

U.S. PATENT DOCUMENTS

2023/0278431 A1* 9/2023 Kim ........................ G06Q 10/20
2023/0406154 A1* 12/2023 Kim ........................ B60L 58/16
2025/0209515 A1* 6/2025 Singh ..................... G06Q 10/06

* cited by examiner

10: BATTERY PACK
400
10
100: VEHICLE
300
510
INFORMATION MANAGEMENT SYSTEM
500: BATTERY UTILIZATION SYSTEM
320
330
100
200
510
400
10: BATTERY PACK
500: BATTERY UTILIZATION SYSTEM
1: BATTERY REUSE MANAGEMENT SYSTEM

FIG. 2

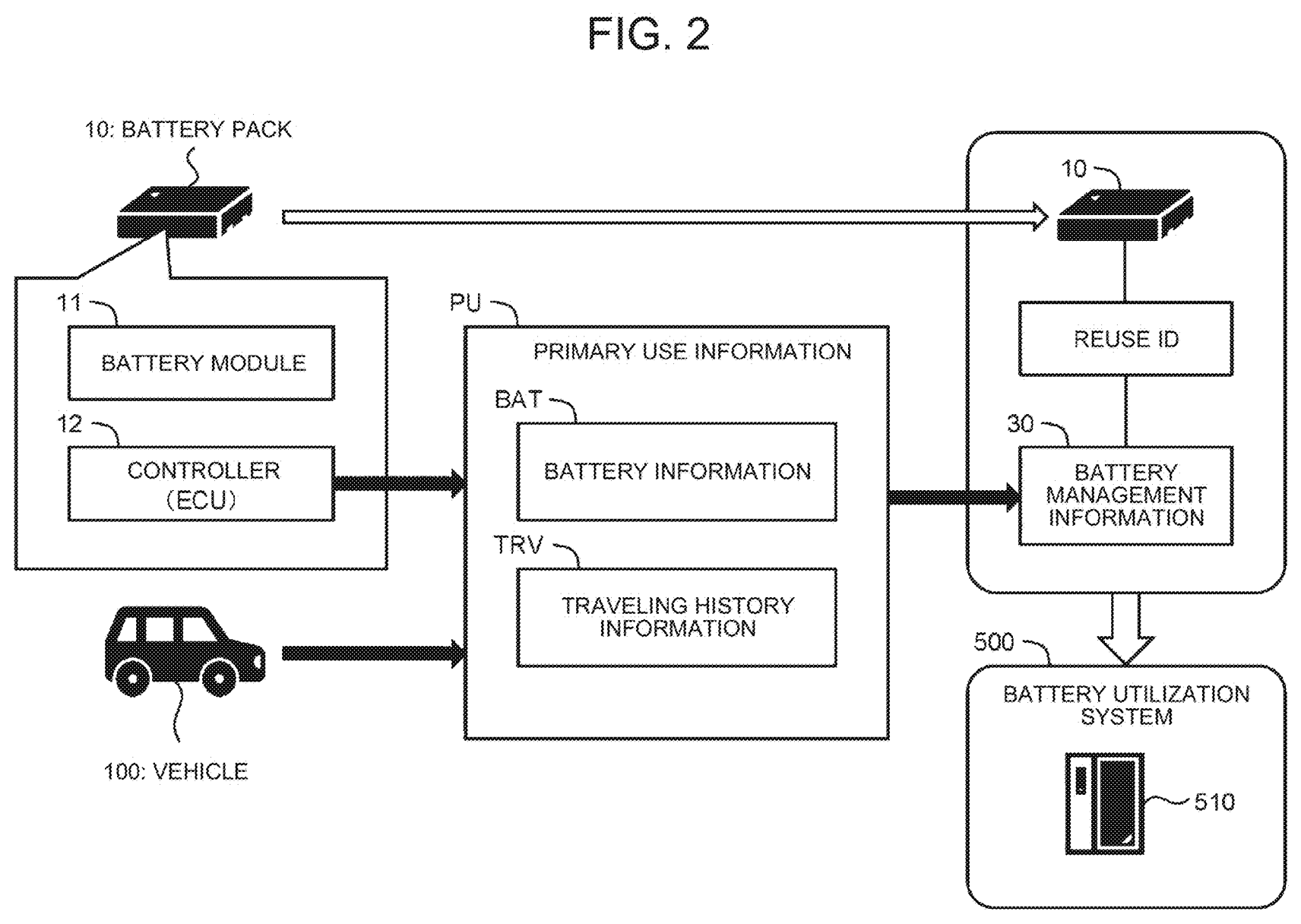

10: BATTERY PACK
11 BATTERY MODULE
12 CONTROLLER (ECU)
100: VEHICLE
PU PRIMARY USE INFORMATION
BAT BATTERY INFORMATION
TRV TRAVELING HISTORY INFORMATION
10
REUSE ID
30 BATTERY MANAGEMENT INFORMATION
500 BATTERY UTILIZATION SYSTEM
510

FIG. 5

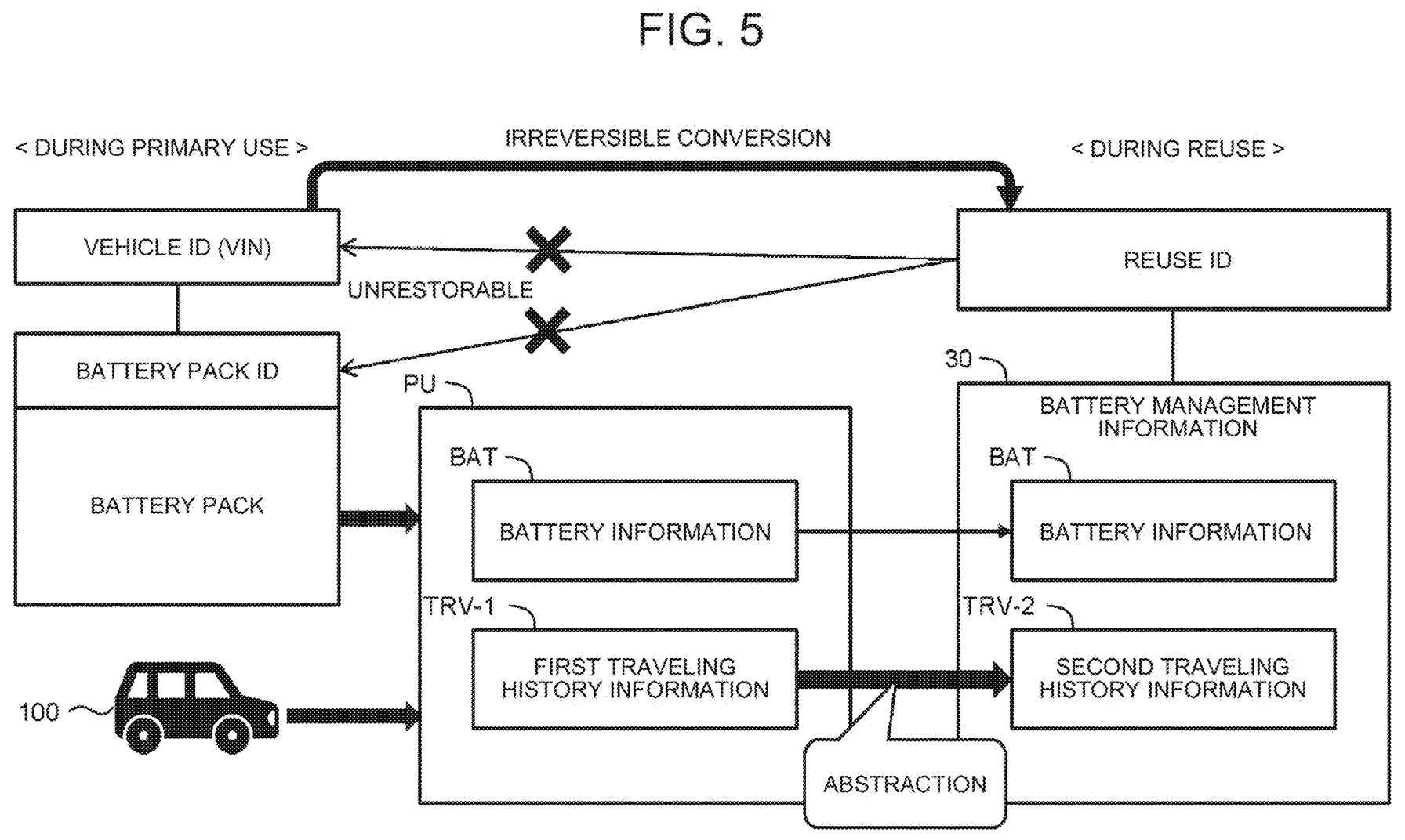

< DURING PRIMARY USE >

VEHICLE ID (VIN)

BATTERY PACK ID

BATTERY PACK

100

IRREVERSIBLE CONVERSION

UNRESTORABLE

< DURING REUSE >

REUSE ID

PU

BAT

BATTERY INFORMATION

TRV-1

FIRST TRAVELING HISTORY INFORMATION

ABSTRACTION

30

BATTERY MANAGEMENT INFORMATION

BAT

BATTERY INFORMATION

TRV-2

SECOND TRAVELING HISTORY INFORMATION

INFORMATION MANAGEMENT SYSTEM
300
330
320
310
INFORMATION PROCESSING DEVICE
TERMINAL
200
210
INFORMATION PROCESSING DEVICE
VEHICLE
100
10
BATTERY PACK
110
INFORMATION PROCESSING DEVICE

BATTERY REUSE MANAGEMENT SYSTEM

CROSS-REFERENCE TO RELATED APPLICATION

This application claims priority to Japanese Patent Application No. 2024-049003 filed on Mar. 26, 2024, incorporated herein by reference in its entirety.

BACKGROUND

1. Technical Field

The present disclosure relates to a technique for managing the reuse of battery packs that had been installed in vehicles.

2. Description of Related Art

Japanese Unexamined Patent Application Publication No. 2015-101195 discloses a vehicle information communication system. A vehicle converts a vehicle identifier unique to the vehicle into another identifier using conversion information. Furthermore, the vehicle associates vehicle status information with the other identifier and then transmits them to a vehicle status information server.

Those techniques which are disclosed in Japanese Unexamined Patent Application Publication No. 2018-181323 and Japanese Unexamined Patent Application Publication No. 2022-128891 are known as other techniques related to the management of vehicle information.

SUMMARY

The reuse of a battery pack installed in a vehicle will be reviewed. If a vehicle in which a battery pack had been installed and a vehicle user of the vehicle are identified when the battery pack is reused, it is undesirable from the viewpoint of protecting personal information. It is desirable to reduce the possibility that the vehicle in which the battery pack had been installed and the vehicle user of the vehicle are identified. The above-mentioned JP 2015-101195 A, JP 2018-181323 A, and JP 2022-128891 A do not consider the reuse of battery packs.

A first aspect of the present disclosure relates to a battery reuse management system for managing reuse of a battery pack that had been installed in a vehicle.

The battery reuse management system includes one or more processors.

The one or more processors acquire battery information reflecting a use history of the battery pack during primary use in the vehicle.

The one or more processors acquire first traveling record information indicating at least one of a total traveling distance and position history of the vehicle.

The one or more processors acquire second traveling record information by abstracting the first traveling record information.

The one or more processors acquire battery management information that includes the battery information and the second traveling information, but does not include the first traveling record information.

The one or more processors acquire reuse identification information which is identification information of the battery pack during the reuse.

The one or more processors provide the reuse identification information and the battery management information to a user who reuses the battery pack or a user who desires to reuse the battery pack.

According to the present disclosure, the second traveling record information is obtained by abstracting the first traveling record information of the vehicle. The battery management information includes the battery information and the second traveling record information, but does not include the first traveling record information. Such battery management information is provided in association with reuse identification information. Therefore, it is possible to restrain the vehicle and a vehicle user from being identified from the battery management information. This is preferable from the viewpoint of protection of personal information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a conceptual diagram showing information related to the reuse of a battery pack;

FIG. 5 is a conceptual diagram showing a third example of the processing for concealing personal information.

DETAILED DESCRIPTION OF EMBODIMENTS

An embodiment of the present disclosure will be described with reference to the accompanying drawings.

1. Battery Reuse Management System

Figure 1:
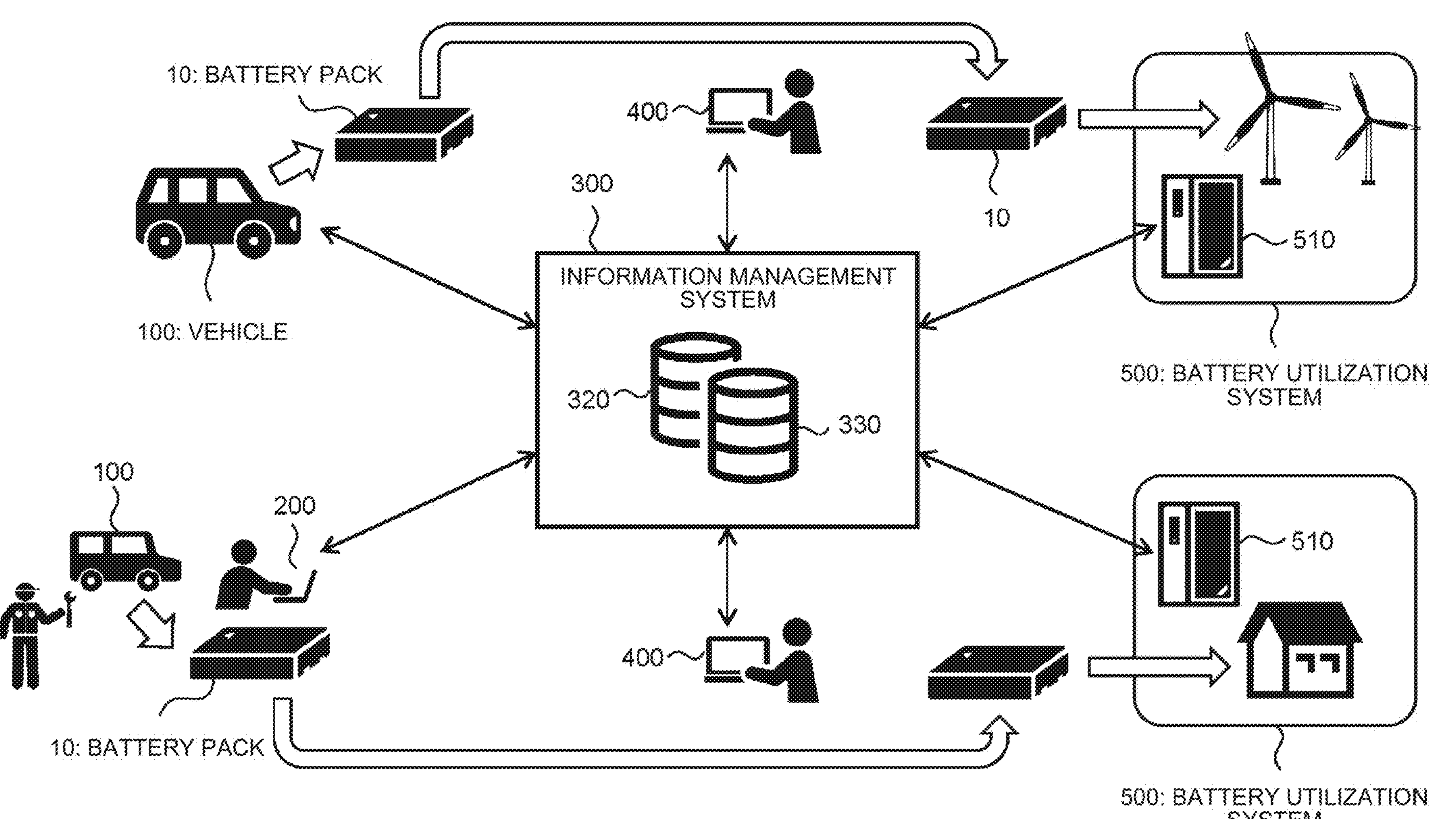
FIG. 1 is a conceptual diagram showing an overview of a battery reuse management system.

FIG. 1 is a conceptual diagram showing an overview of a battery reuse management system 1 according to the present embodiment. The battery reuse management system 1 manages reuse of a battery pack 10. The reuse is a concept including secondary use, tertiary use, etc. In particular, the battery reuse management system 1 manages the reuse of a battery pack 10 installed in a vehicle 100. The vehicle 100 is a battery electric vehicle (BEV) or a hybrid electric vehicle (HEV, PHEV) that uses an electric motor as a driving power unit for traveling. The battery pack 10 is installed in the vehicle 100, and the electric motor is driven with electric power supplied from the battery pack 10.

The battery reuse management system 1 includes one or more vehicles 100 and an information management system 300. The information management system 300 serves as an information platform for managing various information. The information management system 300 includes one or more servers. The information management system 300 may be configured by a plurality of servers that perform distributed processing. Each vehicle 100 and the information management system 300 can communicate with each other via a wireless communication network.

The vehicle 100 may periodically transmit vehicle information related to the vehicle 100 to the information management system 300. The vehicle information may include traveling record information TRV indicating traveling history of the vehicle 100. For example, the traveling record information TRV includes a total traveling distance of the vehicle 100. As another example, the traveling record information TRV may include position history information of the vehicle 100. The position of the vehicle 100 may be represented by a combination of latitude and longitude.

The vehicle information may include battery information BAT reflecting use history of the battery pack 10. For example, the battery information BAT includes battery use history information. The battery use history information includes at least one of temperature history, state-of-charge (SOC) history, current history, voltage history, charging history, etc. Each history may be expressed as a frequency distribution. The battery information BAT may include state-of-health (SOH). The SOH may be calculated based on the battery use history information. The battery information BAT may include a total charged amount of electricity and a total discharged amount of electricity. The battery information BAT may include a battery capacity and a battery output.

The battery reuse management system 1 may further include a terminal 200 to be used at a vehicle dealer or a vehicle repair shop. At the vehicle dealer or the vehicle repair shop, the vehicle information can also be read out from the vehicle 100 by using a predetermined tool. The vehicle information read out from the vehicle 100 is input to the terminal 200. In other words, the terminal 200 can also obtain the vehicle information. The terminal 200 can communicate with the information management system 300 via a wireless or wired communication network. The terminal 200 may transmit the vehicle information read out from the vehicle 100 to the information management system 300.

The information management system 300 collects, accumulates, and manages vehicle information of a large number of vehicles 100. The information management system 300 includes a vehicle information database 320 that accumulates the vehicle information of the vehicles 100.

Next, a description will be made on the reuse of the battery pack 10 that had been installed in the vehicle 100. The battery pack 10 is removed from the vehicle 100 and reused.

A battery utilization system 500 is a system that utilizes a storage battery. For example, the battery utilization system 500 is a stationary storage battery system that stores renewable energy in a stationary storage battery. As another example, the battery utilization system 500 may be a residential power supply system utilizing a stationary storage battery. According to the present embodiment, the battery pack 10 installed in the vehicle 100 is reused in such a battery utilization system 500. By providing a large number of battery packs 10 from a large number of vehicles 100, the cost reduction of the battery utilization system 500 is promoted, and the spread of the battery utilization system 500 is promoted. Furthermore, the promotion of the utilization of renewable energy also reduces $CO_2$ emissions.

FIG. 2 is a conceptual diagram showing information related to the reuse of the battery pack 10. The battery pack 10 includes one or more battery modules 11 and a controller 12 for controlling the battery pack 10. The controller 12 is also called an electronic control unit (ECU).

When the battery pack 10 is reused, the battery reuse management system 1 acquires primary use information PU. The primary use information PU corresponds to vehicle information when the battery pack 10 was used primarily in the vehicle 100.

For example, the primary use information PU includes battery information BAT reflecting the use history of the battery pack 10 during primary use in the vehicle 100. The battery information BAT is stored in the controller 12 (ECU) inside the battery pack 10, and is read out from the controller 12. For example, just before the battery pack 10 is removed from the vehicle 100, the information processing device of the vehicle 100 acquires the battery information BAT from the controller 12 inside the battery pack 10, and transmits the battery information BAT to the information management system 300. As another example, the battery information BAT may be read out from the controller 12 (ECU) inside the battery pack 10 by using a predetermined tool at a vehicle dealer or a vehicle repair shop. In this case, the terminal 200 acquires the battery information BAT, and transmits the battery information BAT to the information management system 300. Furthermore, as another example, the information management system 300 may acquire the battery information BAT of the vehicle 100 from the vehicle information database 320.

The primary usage information PU may include traveling record information TRV of the vehicle 100 in which the battery pack 10 had been installed. The traveling record information TRV indicates at least one of a total traveling distance and position history of the vehicle 100. The total traveling distance is stored in the controller 12 inside the battery pack 10 or in the storage device of the in-vehicle system. The position history information is obtained from the storage device of the in-vehicle system or the vehicle information database 320 of the information management system 300. For example, just before the battery pack 10 is removed from the vehicle 100, the information processing device of the vehicle 100 acquires the traveling record information TRV and transmits the traveling record information TRV to the information management system 300. As another example, the traveling record information TRV may be read out from the vehicle 100 by using a predetermined tool at a vehicle dealer or a vehicle repair shop. In this case, the terminal 200 acquires the traveling record information TRV and transmits the traveling record information TRV to the information management system 300. Furthermore, as another example, the information management system 300 may acquire the traveling record information TRV of the vehicle 100 from the vehicle information database 320.

The battery management information 30 is information to be used when the battery pack 10 is reused. The battery management information 30 is generated based on the primary usage information PU. More specifically, the battery management information 30 includes at least the battery information BAT. Furthermore, the battery management information 30 may include the traveling record information TRV. The environment (temperature, humidity, etc.) of areas where the vehicle 100 was traveling are various, and the deterioration state of the battery performance changes according to the environment, so that the traveling record information TRV can also be useful information when the battery pack 10 is reused. The battery management information 30 may include the vehicle model type of the vehicle 100 in which the battery pack 10 had been installed. Note that the battery management information 30 may be generated in any of the vehicle 100, the terminal 200, and the information management system 300.

The information management system 300 collects, accumulates, and manages battery management information 30 of a large number of vehicles 100. The information management system 300 includes a battery management information database 330 that accumulates the battery management information 30 of the vehicles 100 (see FIG. 1).

Reuse identification information (hereinafter referred to as "reuse ID") is identification information of the battery pack 10 when it is reused. The details of the reuse ID will be described later. The reuse ID is associated with the battery pack 10.

For example, the reuse ID is written into the controller 12 (ECU) of the battery pack 10. For example, immediately before the battery pack 10 is removed from the vehicle 100, the information processing device of the vehicle 100 generates a reuse ID and writes the reuse ID into the controller 12 of the battery pack 10. Furthermore, the information processing device of the vehicle 100 associates the reuse ID with the primary usage information PU or the battery management information 30, and transmits them to the information management system 300.

As another example, the terminal 200 at a vehicle dealer or a vehicle repair shop may generate the reuse ID. The generated reuse ID is written into the controller 12 (ECU) of the battery pack 10 by a predetermined tool. The terminal 200 also associates the reuse ID with the primary usage information PU or the battery management information 30, and transmits them to the information management system 300.

Furthermore, as another example, a seal or the like on which a two-dimensional code indicating a reuse ID is printed may be affixed to the battery pack 10. A QR code (registered trademark) is illustrated as an example of the two-dimensional code. More specifically, at a vehicle dealer or vehicle repair shop, an operator removes the battery pack 10 from the vehicle 100. The reuse ID is generated by the terminal 200 or the operator. The operator affixes a seal or the like on which a two-dimensional code indicating the reuse ID is printed to the battery pack 10. The terminal 200 also associates the reuse ID with the primary usage information PU or the battery management information 30, and transmits them to the information management system 300.

According to this manner, the information management system 300 acquires the reuse ID and battery management information 30 of the battery pack 10. The information management system 300 associates the reuse ID with the battery management information 30 in the battery management information database 330. In other words, the information management system 300 manages the reuse ID and the battery management information 30 in association with each other.

The battery pack 10 removed from the vehicle 100 is provided to a user who reuses the battery pack 10 (hereinafter referred to as a "reuse user" or "reuser"). The reuse user is an operator of the battery utilization system 500. Furthermore, the information management system 300 provides the reuse user with the reuse ID and the battery management information 30 in association with each other. In other words, a set of three items of the battery pack 10, the reuse ID of the battery pack 10, and the battery management information 30 related to the battery pack 10 is provided to the reuse user. In other words, the battery pack 10 and the battery management information 30 are associated with the reuse ID, and provided to the reuse user.

More specifically, the battery utilization system 500 includes an information collection device 510. The information collection device 510 can communicate with the information management system 300 via a wired or wireless communication network. The information management system 300 transmits the reuse ID and battery management information 30 of the battery pack 10 to the information collection device 510 of the battery utilization system 500 in which the battery pack 10 is to be reused. The information collection device 510 manages the reuse ID and the battery management information 30 in association with each other.

Furthermore, the reuse ID of the battery pack 10 is stored in the controller 12 inside the battery pack 10. Alternatively, a two-dimensional code indicating the reuse ID is attached to the battery pack 10. Therefore, in the battery utilization system 500, the battery pack 10, the reuse ID, and the battery management information 30 are associated with one another.

When the battery pack 10 is reused in the battery utilization system 500, the information collection device 510 monitors the usage status of the battery pack 10 and adds the use history information of the battery pack 10 to the battery management information 30 (battery information BAT). As a result, the battery management information 30 includes the battery information BAT at the time of reuse in the battery utilization system 500 in addition to the battery information BAT at the time of primary use in the vehicle 100.

The information collection device 510 periodically uploads the latest battery management information 30 together with the reuse ID to the information management system 300. The information management system 300 periodically acquires the latest battery management information 30 and the reuse ID. The information management system 300 updates the battery management information 30 associated with the reuse ID in the battery management information database 330 to the latest information.

The information management system 300 may calculate the current state (battery performance, deterioration state, etc.) of the battery pack 10 based on the latest battery management information 30. The information management system 300 may also predict the future state (deterioration state, life, etc.) of the battery pack 10 based on the latest battery management information 30. By taking into account the usage status of the battery pack 10 not only during primary use, but also during reuse, it is possible to perform highly accurate deterioration prediction and life prediction of the battery pack 10. The information management system 300 may transmit the prediction results of the current state and future state of the battery pack 10 to the information collection device 510. In other words, the information management system 300 may feed back the prediction results of the current state and future state of the battery pack 10 to the reuse user. The prediction results of the current state and future state of the battery pack 10 are useful for the reuse user.

Furthermore, the collection status of recyclable materials can also be predicted by predicting the lifespan of the battery pack 10. In other words, it is possible to predict (estimate) how much recyclable material can be secured at what period. The higher the accuracy of the lifespan prediction, the higher the accuracy of the prediction of the collection of recyclable materials.

A user who desires to reuse a battery pack 10 is hereinafter referred to as a "reuse-desiring user". A reuse-desiring user may become a reuse user in the future. The information management system 300 may provide the reuse-desiring user with the reuse ID and battery management information 30 of the battery pack 10. More specifically, the reuse-desiring user uses a terminal 400 (see FIG. 1) to request the information management system 300 to supply information. The information management system 300 provides the battery management information 30 and reuse IDs of various battery packs 10 to the terminal 400. The reuse-desiring user can select a desired battery pack 10 (reuse ID) by watching the battery management information 30 displayed on the terminal 400.

The reuse-desiring user may use the terminal 400 to register performance information required to the battery pack 10 into the information management system 300. The reuse-desiring user may use the terminal 400 to register information on a planned use environment of the battery pack 10 (installation location, connection system, operation schedule, etc.) into the information management system 300. The information management system 300 may take into consideration information provided from reuse-desiring users to determine a reuse user to which the battery pack 10 will be provided.

The reuse-desiring user may use the terminal 400 to register a purchase table into the information management system 300. For example, the purchase table indicates the correspondence between the product number of the battery pack 10, required performance (e.g., battery output, battery capacity), and a purchase price. The information management system 300 may take into consideration purchase tables provided from reuse-desiring users to determine a reuse user to whom the battery pack 10 will provided. As a result, it is expected that the battery pack 10 will be traded at a fair price. When the battery pack 10 is traded at a fair price, a vehicle user who is a provider of the battery pack 10 can also be given a fair rebate. Proper rebate leads to increased motivation to provide battery packs 10. This contributes to an improvement in the collection rate of battery packs 10. By improving the collection rate of the battery pack 10, the cost reduction of the battery utilization system 500 is further promoted, and the spread of the battery utilization system 500 is further promoted.

2. Concealment of Personal Information

It is undesirable from the viewpoint of protection of personal information that a vehicle 100 in which a battery pack 10 had been installed and a vehicle user of the vehicle 100 (e.g., vehicle owner) are identified when the battery pack 10 is reused. Concealment of personal information when the battery pack 10 is reused will be reviewed.

2-1. First Example

As described above, the reuse ID is required when the battery pack 10 is used. In particular, the reuse ID is required so that the information management system 300 and the battery utilization system 500 shares and updates the battery management information 30.

First, as a comparative example, a case where the vehicle identification information unique to the vehicle 100 (hereinafter referred to as "vehicle ID") is used as the reuse ID of the battery pack 10 as it is will be reviewed. The vehicle ID is also called VIN (Vehicle Identification Number). Since the vehicle ID is unique to the vehicle 100, the vehicle 100 can be identified from the vehicle ID. Furthermore, if there is information indicating a correspondence between the vehicle ID and the vehicle user, the vehicle user can also be identified from the vehicle ID. In other words, it can be said that the vehicle ID has an aspect of personal information. Therefore, it is not preferable from the viewpoint of protection of personal information to use the vehicle ID as the reuse ID of the battery pack 10 as it is.

Figure 3:
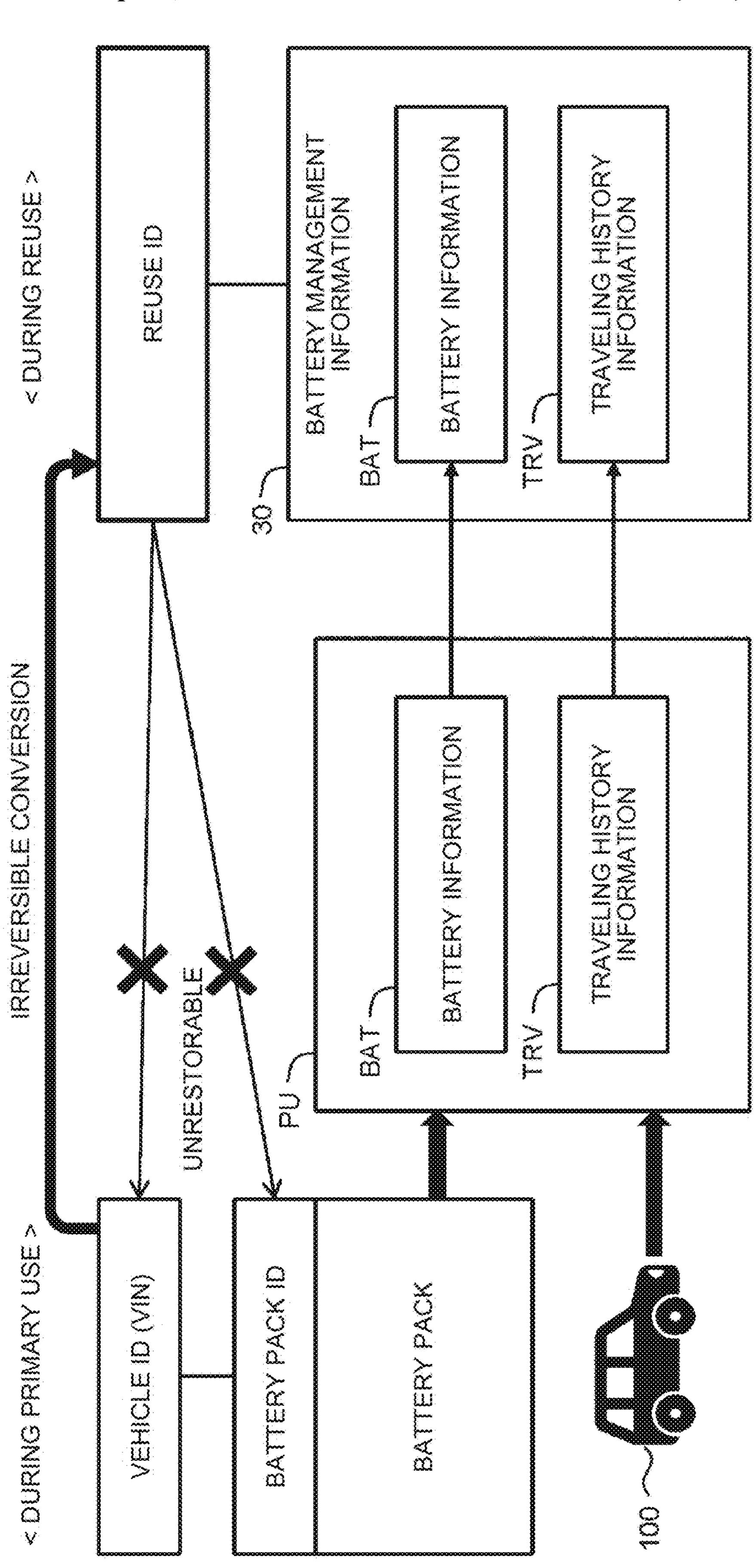
FIG. 3 is a conceptual diagram showing a first example of processing for concealing personal information.

FIG. 3 is a conceptual diagram showing a first example of processing for concealing personal information. According to the first example, information that cannot identify the vehicle 100 in which the battery pack 10 had been installed and the vehicle user of the vehicle 100 is used as the reuse ID. In other words, the reuse ID is set such that the vehicle ID and the battery pack ID cannot be restored from the reuse ID.

For example, information obtained by irreversibly converting the vehicle ID using a predetermined irreversible conversion algorithm is generated as the reuse ID of the battery pack 10. In this case, the reuse ID is not the vehicle ID itself, but is different for each vehicle 100. Furthermore, it is not possible to restore the original vehicle ID from the reuse ID. Note that the subject of the conversion processing may be any of the vehicle 100, the terminal 200, and the information management system 300. Any of the vehicle 100, the terminal 200, and the information management system 300 acquires the vehicle ID and irreversibly converts the vehicle ID into a reuse ID.

As another example, the reuse ID may be a random number generated at random. In this case, the subject that generates the reuse ID may be any of the vehicle 100, the terminal 200, and the information management system 300.

As described above, according to the first example, the reuse ID is set such that the vehicle ID and the battery pack ID cannot be restored from the reuse ID. In other words, information that cannot identify the vehicle 100 and the vehicle user is set as the reuse ID. As a result, the vehicle 100 and the vehicle user can be prevented from being identified from the reuse ID. This is preferable from the viewpoint of protection of personal information.

Furthermore, since the vehicle user is not identified, the vehicle user can provide the battery pack 10 for reuse with peace of mind. This contributes to an improvement in the collection rate of the battery pack 10. The improvement in the collection rate of the battery pack 10 further promotes a reduction in the cost of the battery utilization system 500, and further promotes the spread of the battery utilization system 500.

Note that, in the present embodiment, it is the vehicle ID and the vehicle user that are to be kept secret, and it is not the battery pack 10 from which the battery information BAT is extracted that is to be kept secret. Rather, the battery information BAT and the battery pack 10 from which the battery information BAT is extracted are actively associated with each other, and provided to a reuse user.

2-2. Second Example

Figure 4:
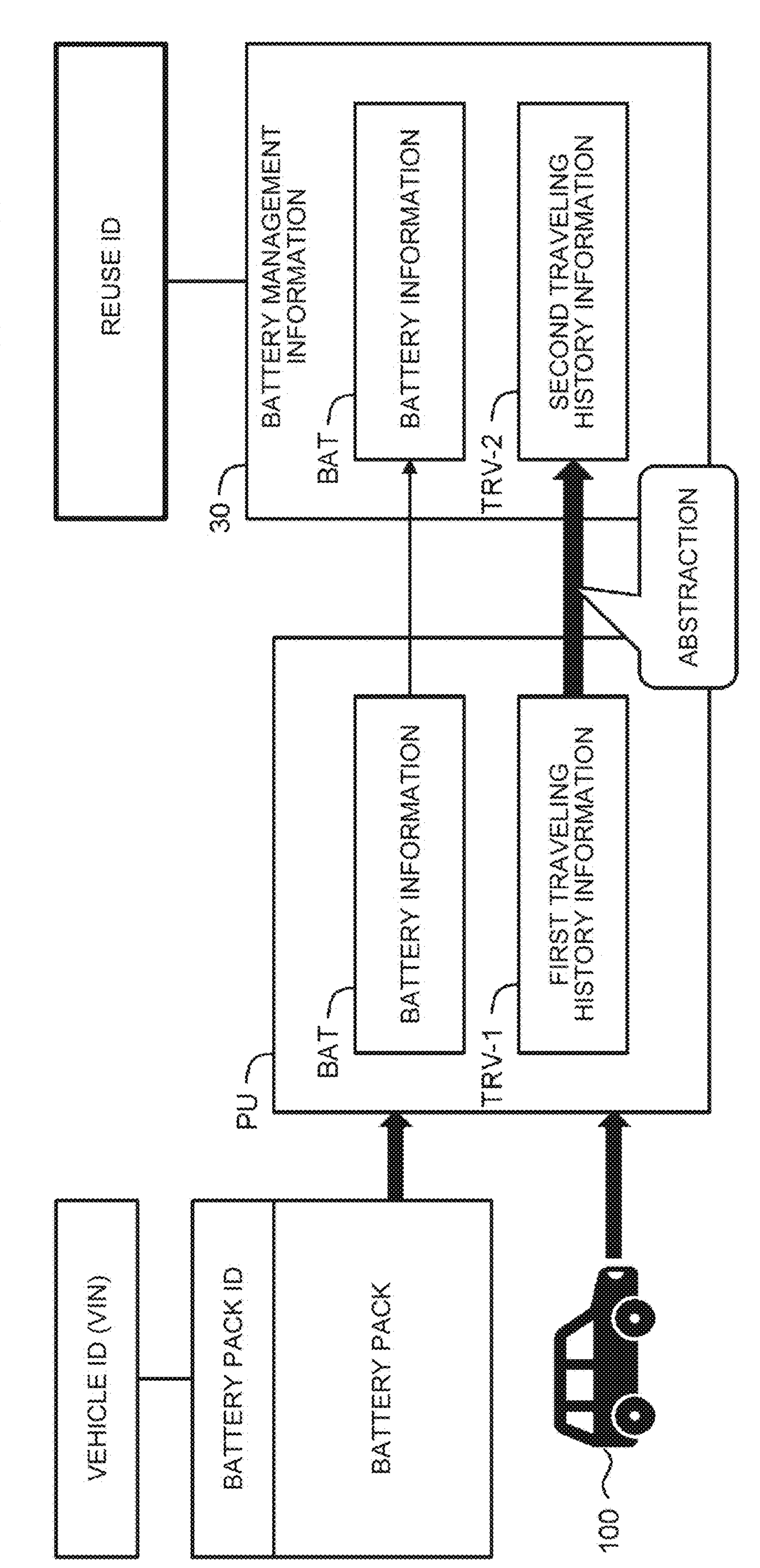
FIG. 4 is a conceptual diagram showing a second example of the processing for concealing personal information.

FIG. 4 is a conceptual diagram showing a second example of the processing for concealing personal information. A case where the primary use information PU includes traveling record information TRV will be reviewed. For convenience, the traveling record information TRV included in the primary use information PU is hereinafter referred to as "first traveling record information TRV-1". The first traveling record information TRV-1 indicates at least one of the total traveling distance and position history of the vehicle 100 in which the battery pack 10 had been installed. The position of the vehicle 100 is represented by a combination of latitude and longitude.

There is a possibility that the vehicle 100 may be identified from the first traveling record information TRV-1. For example, when the total traveling distance is known down to the last digit, the vehicle 100 may be identified from the total traveling distance. As another example, the vehicle 100 may be identified from the history of latitude and longitude.

Therefore, according to the second example, second traveling record information TRV-2 is obtained by abstracting the first traveling record information TRV-1. The subject of this abstraction processing may be any of the vehicle 100, the terminal 200, and the information management system 300.

For example, the abstraction processing rounds the total traveling distance of the vehicle 100 included in the first traveling record information TRV-1. For example, rounding the total traveling distance may be omitting any fraction of the total traveling distance that is less than a predetermined digit (e.g., the hundreds digit, the thousands digit). As another example, rounding the total traveling distance may be rounding up any fraction of the total traveling distance that is less than a predetermined digit. As yet another example, rounding the total traveling distance may be rounding off any fraction of the total traveling distance that is less than a predetermined digit. As a result, a rounded value of the total traveling distance may be equal to a value such as 1,000 km or 2,000 km. As yet another example, rounding the total traveling distance may be expressing the total traveling distance in a predetermined distance unit. The predetermined distance unit may be any value, but it may be equal to a value such as 500 km, 2,000 km or 5,000 km. As an example, in a case where the total traveling distance is expressed in unit of 2,000 km, the total traveling distance is expressed as 0 km when the total traveling distance is less than 2,000 km, the total traveling distance is expressed as 2,000 km when the total traveling distance is equal to 2,000 km or more and is less 4,000 km, and the total traveling distance is expressed as 4,000 km when the total traveling distance is equal to 4,000 km or more and is less than 6,000 km. The same applies to cases where the predetermined distance is set to other values. The second traveling record information TRV-2 obtained by the rounding described above does not include the total traveling distance itself, but includes the rounded value of the total traveling distance.

As another example, the abstraction processing abstracts the position history of the vehicle 100 included in the first traveling record information TRV-1. Abstracting the position history means, for example, replacing the latitude and longitude history with the name of a predetermined area (e.g., prefecture, city, town or village, state, or city). The second traveling record information TRV-2 does not include the position history itself, but includes area information that abstracts the position history.

In this way, the second traveling record information TRV-2 is obtained by abstracting the first traveling record information TRV-1. The battery management information 30 to be used when the battery pack 10 is reused includes the battery information BAT and the second traveling record information TRV-2, but does not include the first traveling record information TRV-1. Such battery management information 30 is provided in association with a reuse ID. Therefore, it is possible to restrain the vehicle 100 and the vehicle user from being identified from the battery management information 30. This is preferable from the viewpoint of protecting personal information.

2-3. Third Example

FIG. 5 is a conceptual diagram showing a third example of processing for concealing personal information. The third example is a combination of the first and second examples described above. According to the third example, both the effect obtained by the first example and the effect obtained by the second example can be obtained.

3. Configuration Example

Figure 6:
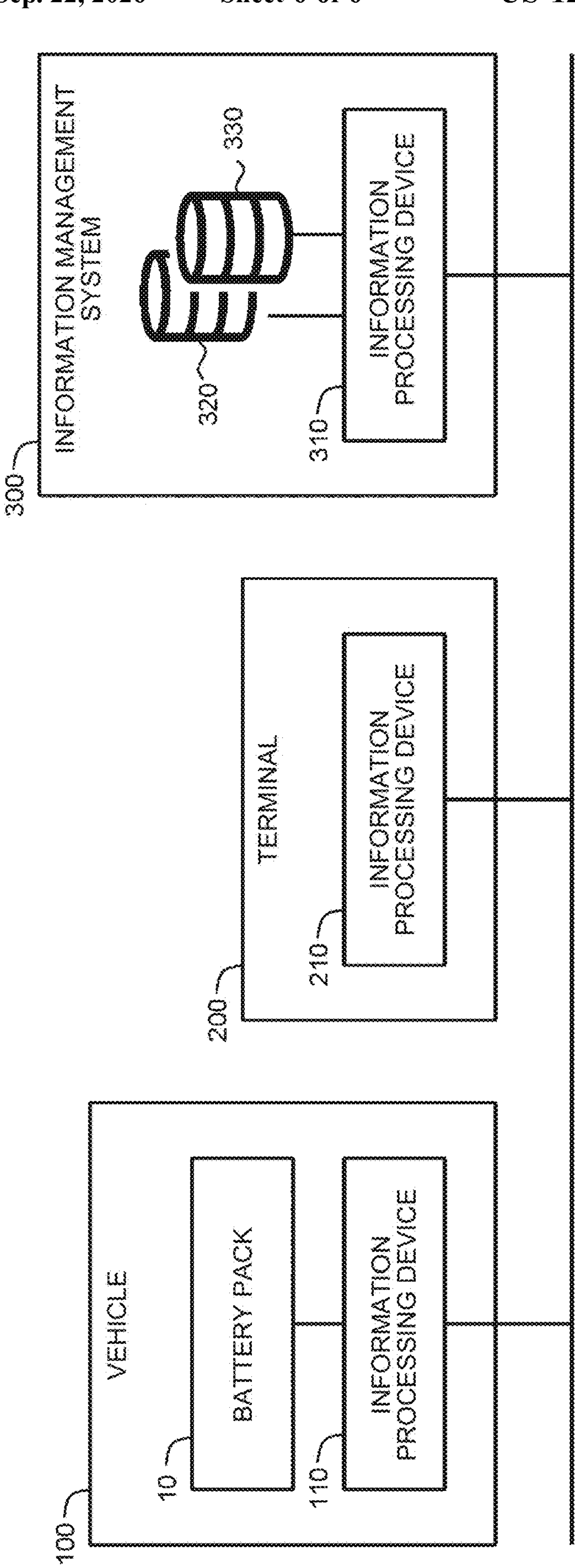
FIG. 6 is a block diagram showing a configuration example of the battery reuse management system.

FIG. 6 is a block diagram showing a configuration example of a battery reuse management system 1 according to the present embodiment. The vehicle 100, the terminal 200, and the information management system 300 are capable of communicating with one another via a communication network.

The vehicle 100 includes a battery pack 10 and an information processing device 110. The information processing device 110 can access the battery pack 10, and can read out various information from the battery pack 10. The information processing device 110 also stores various information, executes various information processing, and communicates with the outside via a communication interface. For example, the information processing device 110 includes a controller such as an electronic control unit (ECU). The information processing device 110 may include a data communication module. In general, the information processing device 110 includes one or more processors and one or more storage devices. Examples of the processor include a general-purpose processor, a specific application processor, a central processing unit (CPU), a graphics processing unit (GPU), an application specific integrated circuit (ASIC), a field-programmable gate array (FPGA), an integrated circuit, and/or a combination thereof. Examples of the storage device include a volatile memory, a non-volatile memory, a hard disk drive (HDD), a solid state drive (SSD), and/or a combination thereof. The functions of the information processing device 110 may be implemented by cooperation between a processor for executing a control program and a storage device. The control program is stored in the storage device. Alternatively, the control program may be recorded in a computer-readable recording medium. The information processing device 110 may also be called processing circuitry.

The terminal 200 includes an information processing device 210. The information processing device 210 stores various information, executes various information processing, and communicates with the outside via a communication interface. The information processing device 210 includes one or more processors and one or more storage devices. Examples of the processor include a general-purpose processor, a specific application processor, a CPU, a GPU, an ASIC, an FPGA, an integrated circuit, and/or a combination thereof. Examples of the storage device include a volatile memory, a non-volatile memory, a HDD, an SSD, and/or a combination thereof. The functions of the information processing device 210 may be implemented by cooperation between a processor for executing a control program and a storage device. The control program is stored in the storage device. Alternatively, the control program may be recorded in a computer-readable recording medium. The information processing device 210 may also be called processing circuitry.

The information management system 300 includes a vehicle information database 320, a battery management information database 330, and an information processing device 310. The vehicle information database 320 and the battery management information database 330 are implemented by one or more storage devices. The information processing device 310 can access the vehicle information database 320 and the battery management information database 330. The information processing device 310 also stores various information, executes various information processing, and communicates with the outside via a communication interface. The information processing device 310 includes one or more processors and one or more storage devices. Examples of the processor include a general-purpose processor, a specific application processor, a CPU, a GPU, an ASIC, an FPGA, an integrated circuit, and/or a combination thereof. Examples of the storage device include a volatile memory, a non-volatile memory, a HDD, an SSD, and/or a combination thereof. The functions of the information processing device 310 may be implemented by cooperation between a processor for executing a control program and a storage device. The control program is stored in the storage device. Alternatively, the control program may be recorded in a computer-readable recording medium. The information processing device 310 may also be called processing circuitry.

What is claimed is:

1. A battery reuse management system for managing reuse of a battery pack that had been installed in a vehicle, comprising one or more processors, the one or more processors being configured to:

acquire battery information reflecting a use history of the battery pack during primary use in the vehicle;

acquire first traveling record information indicating at least one of a total traveling distance and position history of the vehicle;

acquire second traveling record information by abstracting the first traveling record information;

acquire battery management information that includes the battery information and the second traveling information, but does not include the first traveling record information;

acquire reuse identification information which is identification information of the battery pack during the reuse; and provide the reuse identification information and the battery management information to a user who reuses the battery pack or a user who desires to reuse the battery pack.

2. The battery reuse management system according to claim 1, wherein the first traveling record information indicates the total traveling distance of the vehicle, and the second traveling record information does not indicate the total traveling distance as it is, but indicates a rounded value of the total traveling distance.

3. The battery reuse management system according to claim 1, wherein the first traveling record information indicates the position history of the vehicle, and the second traveling record information does not include the position history as it is, but includes area information that abstracts the position history.

4. The battery reuse management system according to claim 1, wherein the one or more processors are further configured to acquire, as the reuse identification information, information that is not able to identify the vehicle and a user of the vehicle.

5. The battery management system according to claim 1, wherein the one or more processors are further configured to write the reuse identification information into a controller inside the battery pack.

* * * * *